(12) United States Patent
Nakayama et al.

(10) Patent No.: US 10,281,690 B2
(45) Date of Patent: May 7, 2019

(54) IMAGING OPTICAL SYSTEM, STEREO CAMERA DEVICE AND CAR-MOUNTED CAMERA DEVICE

(71) Applicants: Takahiro Nakayama, Kanagawa (JP); Hiroshi Nakanuma, Kanagawa (JP)

(72) Inventors: Takahiro Nakayama, Kanagawa (JP); Hiroshi Nakanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/638,923

(22) Filed: Mar. 4, 2015

(65) Prior Publication Data

US 2015/0253544 A1    Sep. 10, 2015

(30) Foreign Application Priority Data

Mar. 5, 2014    (JP) .................................. 2014-042616

(51) Int. Cl.
*G02B 9/62*    (2006.01)
*G02B 13/00*    (2006.01)
(Continued)

(52) U.S. Cl.
CPC ............. *G02B 13/005* (2013.01); *G02B 9/64* (2013.01); *G02B 13/0045* (2013.01);
(Continued)

(58) Field of Classification Search
CPC ............. G02B 13/005; G02B 13/0035; G02B 13/0045; G02B 9/16; G02B 9/64
(Continued)

(56) References Cited

U.S. PATENT DOCUMENTS 5,612,816 A * 3/1997 Strahle ............... A61B 1/00193
351/216
6,498,687 B1 * 12/2002 Sekita .................. G02B 15/177
359/680
(Continued)

FOREIGN PATENT DOCUMENTS

JP    01-134411    5/1989
JP    2004-258266 A    9/2004
(Continued)

OTHER PUBLICATIONS

U.S. Pat. No. 8,369,030, Feb. 5, 2013, Sudoh, et al.
(Continued)

*Primary Examiner* — Stephone B Allen
*Assistant Examiner* — Travis Fissel
(74) *Attorney, Agent, or Firm* — Oblon, McClelland, Maier & Neustadt, L.L.P.

(57) ABSTRACT

An imaging optical system including, in order from an object side to an image side, a first lens group having a negative refractive power, an aperture stop, a second lens group having a positive refractive power, is provided. The first lens group includes in order from the object side a first lens having a positive refractive power and a meniscus shape turning a convex surface to the object side, a second lens having a negative refractive power, and a third lens having a positive refractive power. A lens surface positioned closest to the image side in the first lens group is a concave surface to the image side, and a lens surface positioned closest to the object side in the second lens group is a concave surface to the object side.

15 Claims, 7 Drawing Sheets

(51) Int. Cl.
    *G02B 9/64* (2006.01)
    *G06K 9/00* (2006.01)
    *G02B 13/04* (2006.01)
    *G03B 35/00* (2006.01)

(52) U.S. Cl.
    CPC ......... *G02B 13/04* (2013.01); *G06K 9/00791* (2013.01); *G03B 35/00* (2013.01)

(58) Field of Classification Search
    USPC ....... 359/657, 682, 751, 755, 691, 785, 718, 359/717, 716
    See application file for complete search history.

(56) References Cited

U.S. PATENT DOCUMENTS

| | | | |
|---|---|---|---|
| 7,411,746 B2 * | 8/2008 | Kato | G02B 9/04 359/770 |
| 8,369,030 B2 | 2/2013 | Sudoh et al. | |
| 8,379,329 B2 | 2/2013 | Nakayama et al. | |
| 8,721,094 B2 * | 5/2014 | Tanaka | G02B 1/115 359/601 |
| 8,780,462 B2 | 7/2014 | Nakayama | |
| 8,873,161 B2 | 10/2014 | Nakayama | |
| 2006/0274433 A1 * | 12/2006 | Kamo | G02B 15/177 359/793 |

FOREIGN PATENT DOCUMENTS

| | | |
|---|---|---|
| JP | 2010-14895 A | 1/2010 |
| JP | 2010-072051 | 4/2010 |
| JP | 2010-74706 A | 4/2010 |
| JP | 2012-220741 | 11/2012 |

OTHER PUBLICATIONS

U.S. Pat. No. 8,379,329, Feb. 19, 2013, Nakayama, et al.
U.S. Pat. No. 8,873,161, Oct. 28, 2014, Nakayama.
U.S. Pat. No. 8,780,462, Jul. 15, 2014, Nakayama.
U.S. Appl. No. 14/638,923, Mar. 4, 2015, Nakayama.
U.S. Appl. No. 14/631,216, Feb. 25, 2015, Nakayama.
U.S. Appl. No. 14/631,216, filed Feb. 25, 2015.
Japanese Office Action issued in Japanese Patent Application No. 2015-032736 dated Jan. 15, 2019.

* cited by examiner

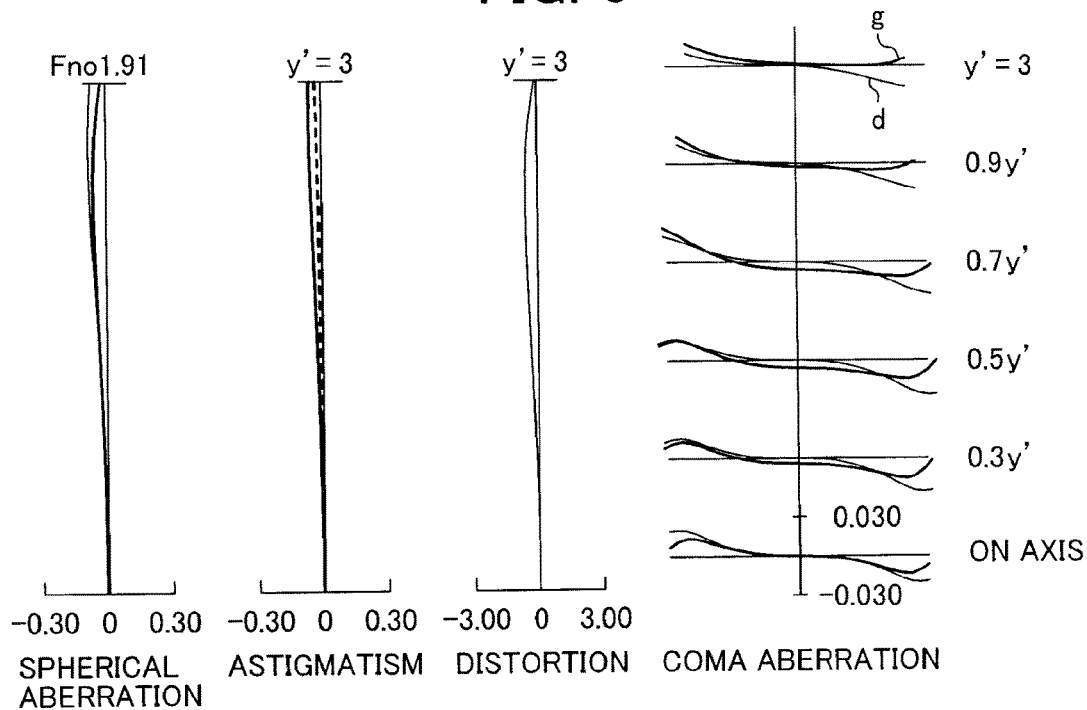
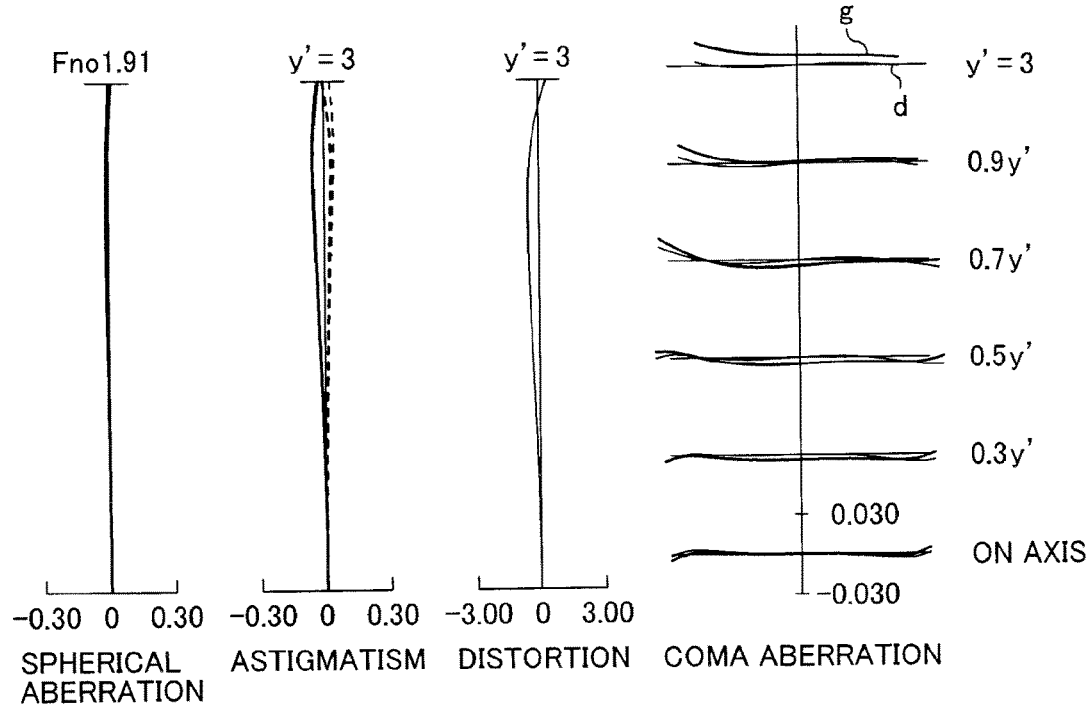

IMAGING OPTICAL SYSTEM, STEREO CAMERA DEVICE AND CAR-MOUNTED CAMERA DEVICE

CROSS-REFERENCE TO RELATED APPLICATIONS

The present application is based upon and claims the benefit of priority from prior Japanese Patent Application Number 2014-042616 filed Mar. 5, 2014, the disclosure of which is hereby incorporated by reference herein in its entirety.

BACKGROUND

The present disclosure relates to an imaging optical system, a stereo camera device and a car-mounted camera device.

In recent years, a wide variety of an imaging device such as a stereo camera device, a car-mounted camera device, a monitoring camera device and so on have been put to practical use as well as a camera device for photographing.

To have a good performance, to be small-sized, to have a certain degree of a wide angle of view and to be bright are generally required for an imaging optical system mounted on such a wide variety of an imaging device.

It is desirable in performance that various kinds of aberrations are corrected. In particular, it is desirable that distortion aberration is corrected assuming a distance measuring with a photographed image or an object recognition with a photographed image using a stereo camera device and a car-mounted camera device.

As a reason for that, an error is easy to occur in processing of a distance measuring or an object recognition where there is a large distortion aberration in a photographed image.

In a camera device for photographing, in recent years, photographed images are digitized, and many users display photographed images with a large magnification. "A deformation by a distortion aberration" of a displayed image is conspicuous when a photographed image is displayed with a large magnification.

Therefore, it is also desirable for an imaging optical system mounted on a camera device for photographing that distortion aberration is corrected.

SUMMARY

An imaging optical system of the present disclosure comprises, in order from an object side to an image side, a first lens group having a negative refractive power, an aperture stop, a second lens group having a positive refractive power. The first lens group includes in order from the object side a first lens having a positive refractive power and a meniscus shape turning a convex surface to the object side, a second lens having a negative refractive power, a third lens having a positive refractive power. A lens surface positioned closest to the image side in the first lens group is a concave surface to the image side, and a lens surface positioned closest to the object side in the second lens group is a concave surface to the object side.

BRIEF DESCRIPTION OF THE DRAWINGS

FIG. 6 is a view showing aberrations of Example 1.
FIG. 7 is a view showing aberrations of Example 2.

DETAILED DESCRIPTION OF THE EMBODIMENTS

Figure 1:
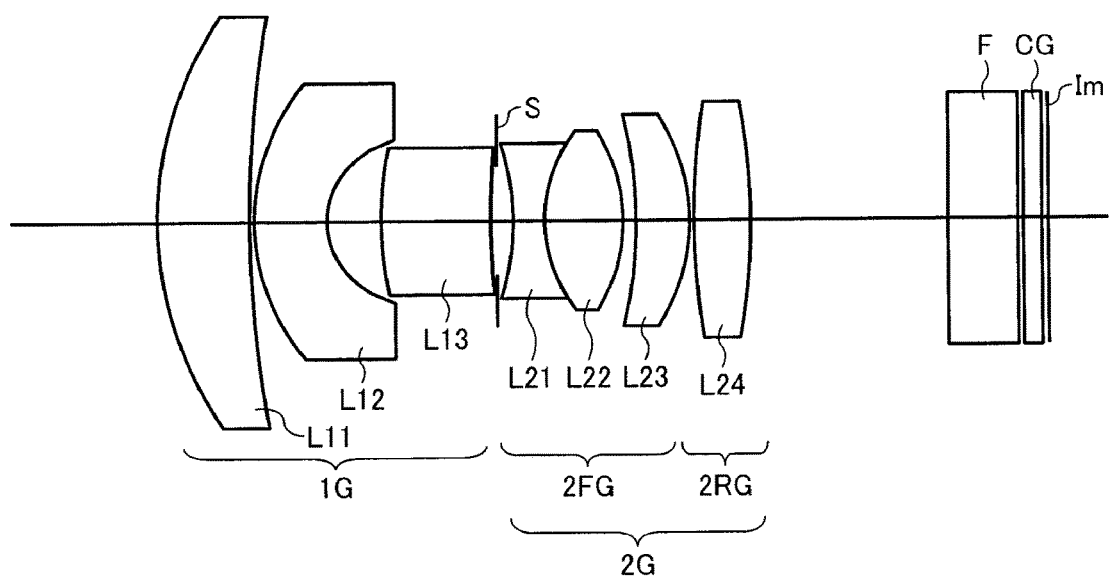
FIG. 1 is a diagram illustrating a structure of an imaging optical system of Example 1.

Embodiments relating to the present disclosure are explained below.

Five embodiments of imaging optical systems are shown in FIG. 1 to FIG. 5. These figures correspond to after-mentioned embodiments 1 to 5 in this order.

For the purpose of simplification, reference signs are used in common among these figures.

In FIG. 1 to FIG. 5, an object is on the left side, and an image of the object is formed on the right side. So, the left side in these figures is the object side, and the right side in these figures is the image side. These figures show that lenses, a filter and a cover glass of an imager are positioned on an optical axis.

In FIG. 1 to FIG. 5, a reference sign "1G" indicates a first lens group, a reference sign "S" indicates an aperture stop, and a reference sign "CG" indicates a cover glass of an imager.

A reference sign "Im" indicates an imaging plane.

A reference sign "L1$i$" indicates a i-th lens from an object side in the first lens group 1G, and a reference sign "L2$i$" indicates a i-th lens from the object side in the second lens group 2G.

The first lens group 1G is negative, in other words, the first lens group 1G has a negative refractive power. The second lens group 2G is positive, in other words, the second lens group 2G has a positive refractive power.

FIG. 1 to FIG. 5 show the imaging optical systems in which the first group 1G, having a negative refractive power, the aperture stop S, and the second group 2G, having a positive refractive power, are arranged in that order from the object side toward the image side.

The first lens group 1G includes a first lens L11 having a positive refractive power and a meniscus shape turning a convex surface to the object side, a second lens L12 having a negative refractive power, and a third lens L13 having a positive refractive power. These lenses are arranged in that order from the object side.

A lens surface positioned closest to the image side in the first lens group 1G (a lens surface of the image side of the third lens L13) has a concave surface to the image side. A lens surface positioned closest to the object side in the second lens group 2G (a lens surface of the object side of the fourth lens L21) has a concave surface to the object side.

In the imaging optical system of the present disclosure, as described above, the first lens group 1G having a negative refractive power is arranged on the object side of the aperture stop S, and the second lens group 2G having a positive refractive power is arranged on the image side of the aperture stop S.

In other words, the imaging optical system of the present disclosure is a retrofocus type. In the embodiments shown in FIG. 1 to FIG. 5, the imaging optical system forms an object image on a light receiving surface of the imager. Because the imaging optical system is a retrofocus type, an angle of incidence of off-axis light beam to the light receiving surface of the imager is suppressed though the angle of incidence of off-axis light beam to the light receiving surface of the imager is generally inclined to be increased with achieving wider angle.

The first lens group 1G includes the first lens L11 having a positive refractive power, the second lens L12 having a negative refractive power, and the third lens L13 having a positive refractive power. These lenses are arranged in that order from the object side, and the first lens group 1G has a negative refractive power as a whole.

A combination of the second lens L12 having a negative refractive power and the third lens L13 having a positive refractive power makes a negative refractive power.

The second lens group 2G has a positive refractive power. An arrangement of a "positive" refractive power of the first lens L11, a "negative" refractive power of the combination of the second lens L12 and the third lens L13, a "positive" refractive power of the second lens group 2G are a triplet-type refractive power arrangement "positive, negative, positive" as a whole. The aperture stop S is arranged between the third lens L13 and the second lens group 2G.

A correction of various aberrations such as a chromatic aberration can be easily performed because of this refractive power arrangement.

Because the first lens group 1G positioned the object side relative to the aperture stop S has a negative refractive power, a lens having a relatively small size can take in a light beam with a wide angle of view.

Furthermore, the first lens L11 positioned closest to the object side in the first lens group 1G is a lens having a positive refractive power having a meniscus shape turning a convex surface to the object side. This suppresses an increase of spherical aberration with an enlargement of a diameter.

The third lens L13 positioned closest to the image side in the first lens group 1G has a lens surface on the side of image side which is a concave surface to the image side, and a fourth lens positioned closest to the object side in the second lens group 2G has a lens surface on the side of the object side which is a concave surface to the object side.

In this way, the convex surface to the image side and the convex surface to the object side face each other across the aperture stop S and thus an air lens which is a biconvex lens is formed.

This lens constitution balances a distortion aberration which is inclined to be increased with achieving wider angle and being a retrofocus type in which a refractive balance is biased, and facilitates a correction of a distortion aberration.

According to an imaging optical system having this lens constitution, a correction of various aberrations can be satisfactorily performed and downsizing can be also performed.

Specifically, a wide angle of view (a half field angle: approximately 29 degrees), a large diameter (F number: equal to approximately 2 or less), a small size, a reduced distortion and an excellent image formation performance can be satisfied, for example.

For more improved performance, an air gap (an interval between lens surfaces on an optical axis) between the second lens L12 in the first lens group 1G and the third lens L13 in the first lens group 1G is the widest in the whole system.

The second lens L12 is the only lens having a negative refractive power in the first lens group 10, and the second lens L12 contributes greatly to correct a spherical aberration which increases with an enlargement of a diameter.

By increasing the air gap between the second lens L12 and the third lens L13, an angle of inclination of light beam can be suppressed, and performance degradation caused by a manufacture error can be suppressed.

In the imaging optical system of the current disclosure, in addition to the constitution described above, it is preferable that the imaging optical system satisfies the one or more following conditions.

$$0.15 < |f/fa| < 1.00 \tag{1}$$

$$2.00 < |f1/f| < 20.00 \tag{2}$$

$$0.15 < f/AL < 0.50 \tag{3}$$

Each parameter in the conditions (1) to (3) is explained hereinafter.

"f" is a focal distance of the whole system of the imaging optical system. "fa" is a focal distance of a biconvex air lens which is formed between a lens surface positioned closest to the image side in the first lens group 1G and a lens surface positioned closest to the object side in the second lens group 2G (fa<0).

"AL" is a distance on an optical axis between a lens surface positioned closest to the object side in the first lens group 1G and an imaging plane. This is also referred to an optical system overall length hereinafter.

The condition (1) is a condition which regulates a preferable range of a ratio of the focal distance of the whole system of the imaging optical system to the focal distance of a biconvex air lens which is formed between a lens surface positioned closest to the image side in the first lens group 1G and a lens surface positioned closest to the object side in the second lens group 2G.

A refractive power of the air lens is negative because the air lens is formed in a biconvex shape.

If the parameter exceeds the upper limit value of the condition (1), the absolute value of the refractive power of the air lens is increased, and the distance between the concave surfaces across the aperture stop S is increased, and the optical system overall length is increased. Also, an angle of inclination of light beam at each concave surface of the air lens is increased, and it may enhance a sensitivity of performance deterioration to a manufacturing error.

If the parameter exceeds the lower limit value of the condition (1), a contribution to a distortion aberration correction of the air lens is apt to be small, and the whole optical system may become large.

By satisfying the condition (1), an increase in the optical system overall length and an enhancement of sensitivity of a performance deterioration to a manufacturing error can be suppressed and a contribution to a distortion aberration correction can be kept.

Furthermore, by satisfying the following condition (1A), the effect of the condition (1) can be promoted.

$$0.18 < |f/fa| < 0.75 \tag{1A}$$

The condition (2) is a condition which regulates a preferable range of a ratio of f1: a focal distance of the first lens group to f: the focal distance of the whole system of the imaging optical system.

The refractive power of the first lens group is negative, so f1: a focal distance of the first lens group is negative. The negative refractive power of the first lens group depends on the negative refractive power of the second lens.

If the parameter exceeds the upper limit value of the condition (2), the negative refractive power of the second lens in the first lens group becomes small, and a correcting capability of a chromatic aberration is apt to be decreased.

If a difference between a positive refractive power and a negative refractive power in the first lens group becomes large, a sensitivity of a performance deterioration to a manufacturing error may be enhanced.

If the parameter exceeds the lower limit value of the condition (2), the difference between a refractive power of the first lens group and a refractive power of the second lens group become large, the sensitivity of a performance deterioration to a manufacturing error may be enhanced, or the whole optical system may become large.

By satisfying the condition (2), a decrease of a correcting capability of a chromatic aberration, an enhancement of sensitivity of performance deterioration to a manufacturing error and an enlargement of the whole optical system can be suppressed.

Furthermore, by satisfying the following condition (2A), the effect of the condition (2) can be promoted.

$$2.50 < |f1/f| < 15.00 \tag{2A}$$

The condition (3) is a condition which regulates a preferable range of a ratio of the focal distance of the whole system of the imaging optical system to the optical system overall length.

If the parameter exceeds the upper limit value of the condition (3), a constitution of the whole system approximates what is called "front-diaphragm system," a difficulty of a distortion aberration correction is high and obtaining a desired image formation performance is difficult.

This trend becomes strong especially when a suppression of an angle of incidence of light beam to the light receiving surface of the imager is premised.

If the parameter exceeds the lower limit value of the condition (3), though it is advantageous in a correcting an aberration, the optical system overall length become large, and a downsizing of the imaging optical system is difficult.

By satisfying the condition (3), correcting an aberration such as a distortion aberration and a downsizing of the imaging optical system becomes easier.

Furthermore, by satisfying the following condition (3A), the effect of the condition (3) can be promoted.

$$0.20 < f/AL < 0.40 \tag{3A}$$

In the present imaging optical system, as shown in FIG. 1 to FIG. 5, the second lens group 2G having positive refractive power positioned in the image side of the aperture stop S can include a second F lens group 2FG having a positive refractive power as a whole and a second R lens group 2RG having a positive refractive power as a whole.

In this case, the second F lens group 2FG includes at least one lens having a negative refractive power and at least one lens having a positive refractive power.

The second R lens group 2RG includes at least one lens having a positive refractive power.

When a lens having a negative refractive power and a lens having a positive refractive power are arranged one by one in the second F lens group 2FG, a negative refractive power in the second F lens group 2FG and the third lens L13 having a positive refractive power in the first lens group 1G are paired, and a lens having a positive refractive power in the second F lens group 2FG and the second lens L12 having a negative refractive power in the first lens group 1G are paired.

A pair (a lens having a positive refractive power and a lens having a negative refractive power) formed like this can enhance an effect of a correcting a chromatic aberration. By arranging at least one lens having a positive refractive power in the second R lens group 2RG, an exit pupil position adjusting function can be obtained, and an angle of incidence of light beam on the imaging plane Im can be suppressed effectively.

In the case that the second lens group 2G is constituted as above, it is preferable that the following condition is satisfied.

$$0.50 < f2F/f < 2.50 \tag{4}$$

In the condition (4), "f" is a focal distance of the whole system. "f2F" is a focal distance of the second F lens group 2FG.

The condition (4) is a condition which regulates a preferable range of a ratio of the focal distance of the second F lens group 2FG to the focal distance of the whole system.

If the parameter exceeds the upper limit value of the condition (4), the positive power of the second F lens group 2FG becomes small. Therefore, the refractive power of the second R lens group 2RG needs to be high in order to keep a required positive refractive power of the second lens group. As a result, an exit pupil adjusting function of the second R lens group 2RG deteriorates. Or, a correcting capability of a spherical aberration and a correcting capability of a chromatic aberration based on a pair of a lens having a negative refractive power in the first lens group and a lens having a positive refractive power in the second F lens group 2F decreases, and an image formation performance may deteriorate.

If the parameter exceeds the lower limit value of the condition (4), a correcting aberration across the first lens group and the second F lens group becomes excessive, sensitivity of performance deterioration to a manufacturing error may be enhanced, or the whole optical system may become large.

By constituting the second lens group 2G as above, and by satisfying the condition (4), a decrease of an exit pupil adjusting function of the second R lens group 2RG, a correcting capability of a spherical aberration, and a correcting capability of a chromatic aberration can be suppressed effectively.

Furthermore, by satisfying the following condition (4A), the effect of the condition (4) can be promoted.

$$0.75 < f2F/f < 2.00 \tag{4A}$$

By employing glass lenses for all lenses constituting the imaging optical system, a resistance of the imaging optical system to an environmental fluctuations or a change due to aging can be enhanced.

By employing spherical lens for these glass lenses, a polishing in which a residual stress inside a lens is suppressed relatively small can be selected at low cost, and a cost of the imaging optical system can be reduced.

Of course, in the present imaging optical system, some lenses of the constituent lenses can be aspheric lenses.

Before a specific embodiment of the imaging optical system is shown, embodiments of a stereo camera device and a car-mounted camera device with the imaging optical system are briefly explained.

Figure 11:
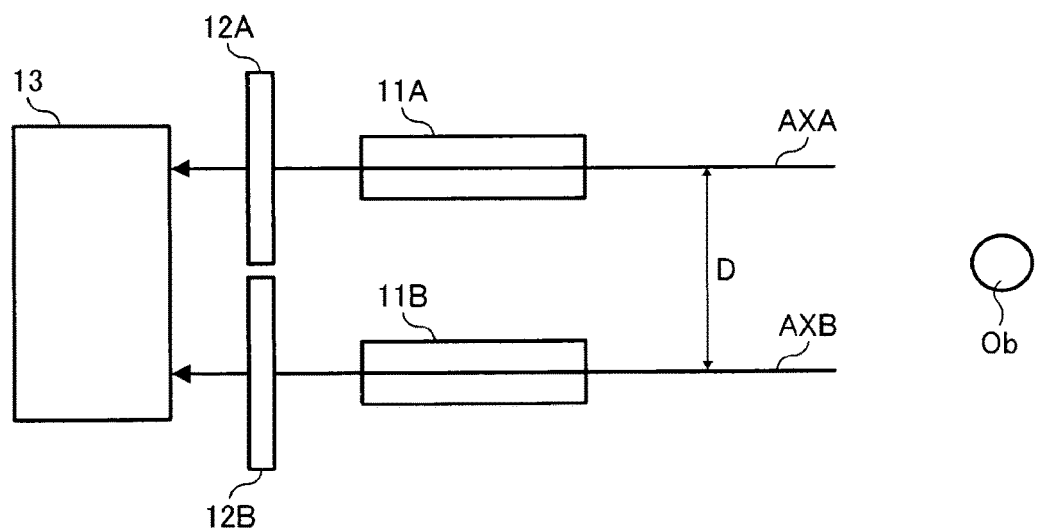
FIG. 11 is a diagram of a stereo camera device with an imaging optical system.

FIG. 11 is a diagram of a stereo camera device with an optical imaging system. In FIG. 11, reference signs "11A"

and "11B" indicate the imaging optical systems, they are the same specifications. The imaging optical systems 11A, 11B can be one of imaging optical systems described in claims, specifically, one of imaging optical systems described in embodiments 1 to 5.

Reference signs "12A" and "12B" indicate imagers, such as CCD sensor or CMOS sensor.

The imaging optical systems 11A, 11B are separately arranged at a distance of a predetermined distance D (a base length). An optical axis AXA and an optical axis AXB are arranged in parallel with each other.

The imaging optical system 11A forms the image of an object Ob on the light receiving surface of the imager 12A. The imaging optical system 11B forms the image of the object Ob on the light receiving surface of the imager 12B. The imagers 12A and 12B input image data of images formed with the imaging optical systems 11A and 11B into a control calculator 13.

The control calculator 13 such as a computer or CPU digitally records an image information input from the imagers 12A and 12B. The control calculator 13 calculates a distance to the object Ob based on the image information recorded digitally.

The control calculator 13 determines a distance D+A between image positions based on the image position of the objects Ob formed on the imagers 12A and 12B.

Specifically, by using a focal distance of the whole system of the imaging optical system: f, the base length D, and the D+A, the distance d to the object Ob is calculated by the following formula.

$$D=f\{1+(D/\Delta)\}$$

This is a distance measurement by a stereo camera device.

Figure 12:
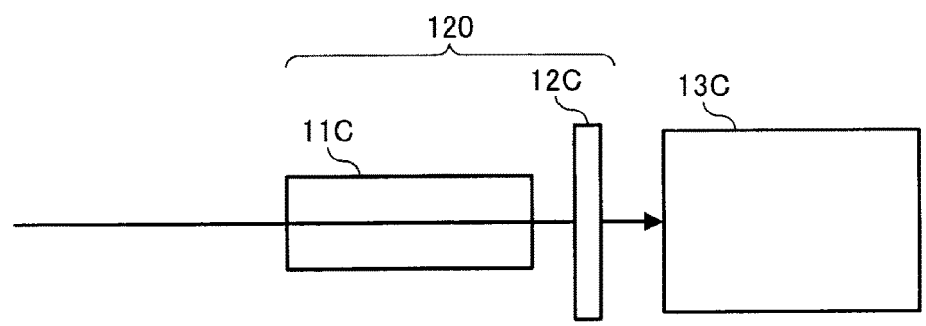
FIG. 12 is a diagram of a car-mounted camera device with an imaging optical system.

FIG. 12 is a diagram of a car-mounted camera device with an optical imaging system. In FIG. 12, a reference sign "120" indicates an imaging system, and a reference sign "13C" indicates a control calculator 13C.

The imaging system 120 has an imaging optical system 11C and imager 12C. The imaging systems 120 and the control calculator 13C constitute a car-mounted camera device, and the car-mounted camera device is mounted on a car (not illustrated). For example, the car-mounted camera device gets an image information of an outside car, and the image information is digitized.

The imaging optical systems 11C can be one of imaging optical systems described in claims, specifically, one of imaging optical systems described in embodiments 1 to 5. The imaging systems 120 in FIG. 12 and the control calculator 13C are convertible into the stereo camera device in FIG. 11. That is, the stereo camera device shown in FIG. 11 can be mounted on a car as a car-mounted camera device.

The following are five non-limiting examples of imaging optical systems. The meanings of signs in each embodiment are as follows.

"f" means a focal distance of the whole system of the imaging optical system. "Fno" means a F number. "ω" means a half field angle. "Y'" means the maximum image height. "R" means a radius of curvature. "D" means an interval between lens surfaces. "Nd" means a refractive index in d-line. "vd" means a Abbe number. "BF" means a back focus.

"Glass type" is a glass material. In each embodiment, all lenses are lenses made by OHARA INC. Product names of OHARA INC. are described in a column "glass type" of data.

The unit of length is "mm" unless otherwise specified.

In the data, a sign "Various filter" envisages one or more filters, for example, an infrared-cut filter, or the like, and is illustrated as a transparent parallel flat plate that is optically equivalent to that.

Embodiment 1 is an embodiment with regard to a structure shown in the FIG. 1. In the imaging optical system of the embodiment 1, as shown in FIG. 1, a first lens group 1G, an aperture stop S, a second lens group 2G are arranged in order from the object side to the image side.

The first lens group 1G includes a lens L11 having a positive refractive power and a meniscus shape turning a convex surface to the object side, a lens L12 having a negative refractive power and a meniscus shape turning a convex surface to the object side, and a lens L13 having a positive refractive power and a meniscus shape turning a convex surface to the object side. These lenses are arranged in that order from the object side.

The second lens group 2G includes a second F lens group 2FG and a second R lens group 2RG. The second F lens group 2FG includes a cemented lens of a lens L21 which is a biconcave lens and a lens L22 which is a biconvex lens, a lens L23 having a positive refractive power and a meniscus shape turning a concave surface to the object side. These lenses are arranged in that order from the object side. The second R lens group 2RG includes a lens L24 which is a biconvex lens.

The imaging optical system of the embodiment 1 includes seven lenses.

| Embodiment 1 | | | | | |
|---|---|---|---|---|---|
| f = 5.35, Fno = 1.91, ω = 29.26 | | | | | |
| Surface number | R | D | Nd | vd | Glass type |
| 1 | 10.13700 | 2.00 | 1.76200 | 40.10 | S-LAM55 |
| 2 | 32.80000 | 0.10 | | | |
| 3 | 5.90000 | 1.57 | 1.72916 | 54.68 | S-LAL18 |
| 4 | 2.13300 | 1.18 | | | |
| 5 | 10.35000 | 2.40 | 1.72151 | 29.23 | S-TIH18 |
| 6 | 25.00000 | 0.10 | | | |
| 7 | Aperture stop | 0.35 | | | |
| 8 | −7.23200 | 0.70 | 1.75520 | 27.51 | S-TIH4 |
| 9 | 4.02500 | 1.694 | 1.71300 | 53.87 | S-LAL8 |
| 10 | −4.70000 | 0.28 | | | |
| 11 | −12.55200 | 1.15 | 1.77250 | 49.60 | S-LAH66 |
| 12 | −5.51700 | 0.10 | | | |
| 13 | 21.00000 | 1.22 | 1.67790 | 55.34 | S-LAL12 |
| 14 | −18.00000 | 4.27 | | | |
| 15 | ∞ | 1.541 | 1.51633 | 64.14 | Various filter |
| 16 | ∞ | 0.10 | | | |
| 17 | ∞ | 0.4 | 1.51633 | 64.14 | Cover glass |
| 18 | ∞ | BF | | | |

| [Numerical value of parameter of condition] | |
|---|---|
| (1) | 0.413 |
| (2) | 3.188 |
| (3) | 0.277 |
| (4) | 1.244   ○ |

Next, embodiment 2 will be described. The embodiment 2 is an embodiment with regard to a structure shown in the FIG. 2.

Figure 2:
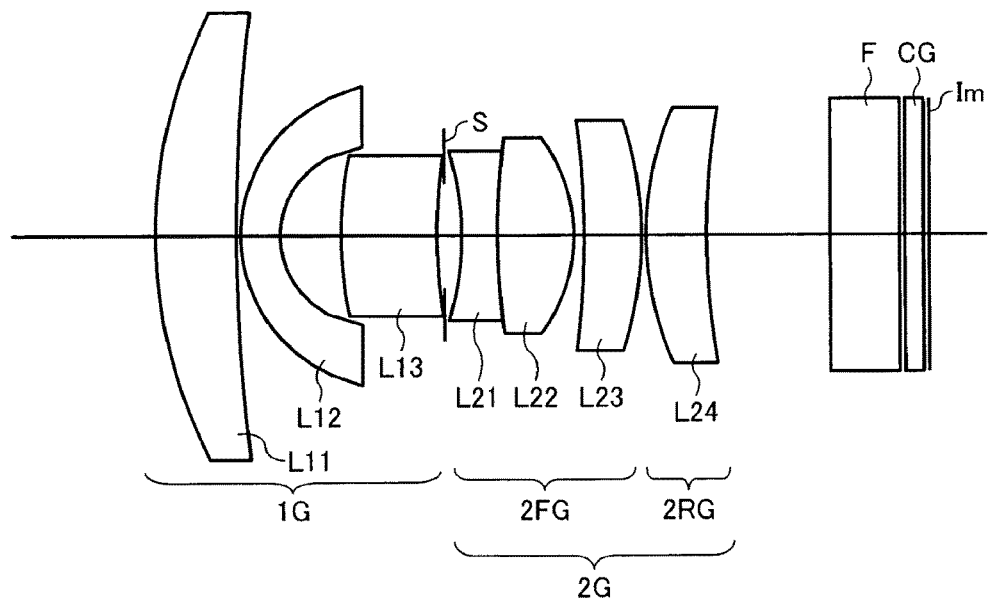
FIG. 2 is a diagram illustrating a structure of an imaging optical system of Example 2.

In the imaging optical system of the embodiment 2, as shown in FIG. 2, a first lens group 1G, an aperture stop S, a second lens group 2G are arranged in order from the object side to the image side.

The first lens group 1G includes a lens L11 having a positive refractive power and a meniscus shape turning a convex surface to the object side, a lens L12 having a negative refractive power and a meniscus shape turning a convex surface to the object side, and a lens L13 having a positive refractive power and a meniscus shape turning a convex surface to the object side. These lenses are arranged in that order from the object side.

The second lens group 2G includes a second F lens group 2FG and a second R lens group 2RG. The second F lens group 2FG includes a cemented lens of a lens L21 which is a biconcave lens and a lens L22 which is a biconvex lens, a lens L23 having a positive refractive power and a meniscus shape turning a concave surface to the object side. These lenses are arranged in that order from the object side. The second R lens group 2RG includes a lens L24 having a positive refractive power and a meniscus shape turning a convex surface to the object side.

The imaging optical system of the embodiment 2 includes seven lenses.

Embodiment 2 f = 5.35, Fno = 1.91, ω = 29.13

| Surface number | R | D | Nd | vd | Glass type |
|---|---|---|---|---|---|
| 1 | 11.50200 | 1.785 | 1.88300 | 40.76 | S-LAH58 |
| 2 | 42.80600 | 0.100 | | | |
| 3 | 3.53500 | 0.861 | 1.72916 | 54.68 | S-LAL18 |
| 4 | 2.03800 | 1.336 | | | |
| 5 | 9.25300 | 2.169 | 1.71736 | 29.52 | S-TIH1 |
| 6 | 13.28100 | 0.100 | | | |
| 7 | Aperture stop | 0.385 | | | |
| 8 | −6.75400 | 0.800 | 1.92286 | 18.90 | S-NPH2 |
| 9 | 17.21700 | 1.672 | 1.78800 | 47.37 | S-LAH64 |
| 10 | −3.83300 | 0.227 | | | |
| 11 | −19.86700 | 1.250 | 1.81600 | 46.62 | S-LAH59 |
| 12 | −8.70000 | 0.10 | | | |
| 13 | 7.54400 | 1.321 | 1.81600 | 46.62 | S-LAH59 |
| 14 | 17.27900 | 2.724 | | | |
| 15 | ∞ | 1.541 | 1.51633 | 64.14 | Various filter |
| 16 | ∞ | 0.100 | | | |
| 17 | ∞ | 0.4 | 1.51633 | 64.14 | Cover glass |
| 18 | ∞ | BF | | | |

[Numerical value of parameter of condition]

| (1) | 0.544 |
|---|---|
| (2) | 11.894 |
| (3) | 0.315 |
| (4) | 1.179 o |

Next, embodiment 3 will be described. The embodiment 3 is an embodiment with regard to a structure shown in the FIG. 3.

Figure 3:
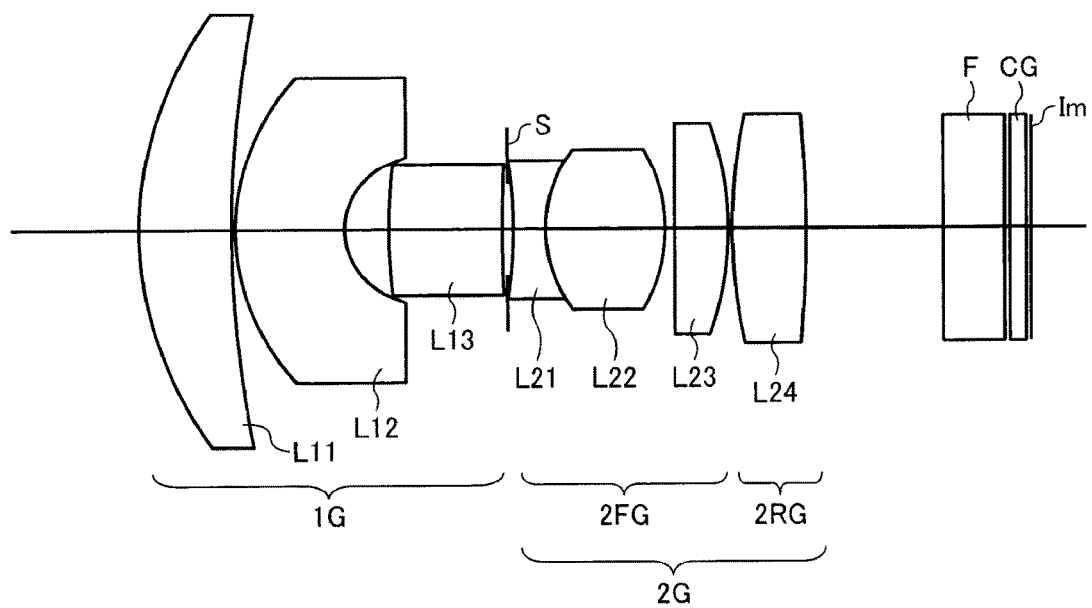
FIG. 3 is a diagram illustrating a structure of an imaging optical system of Example 3.

In the imaging optical system of the embodiment 3, as shown in FIG. 3, a first lens group 1G, an aperture stop S, a second lens group 2G are arranged in order from the object side to the image side.

The first lens group 1G includes a lens L11 having a positive refractive power and a meniscus shape turning a convex surface to the object side, a lens L12 having a negative refractive power and a meniscus shape turning a convex surface to the object side, and a lens L13 having a positive refractive power and a meniscus shape turning a convex surface to the object side. These lenses are arranged in that order from the object side.

The second lens group 2G includes a second F lens group 2FG and a second R lens group 2RG. The second F lens group 2FG includes a cemented lens of a lens L21 which is a biconcave lens and a lens L22 which is a biconvex lens, a lens L23 which is a biconvex lens. These lenses are arranged in that order from the object side. The second R lens group 2RG includes a lens L24 which is a biconvex lens.

The imaging optical system of the embodiment 3 includes seven lenses.

Embodiment 3 f = 5.35, Fno = 1.90, ω = 29.18

| Surface number | R | D | Nd | vd | Glass type |
|---|---|---|---|---|---|
| 1 | 10.88100 | 2.265 | 1.76200 | 40.10 | S-LAM55 |
| 2 | 32.49500 | 0.100 | | | |
| 3 | 6.68000 | 2.690 | 1.72916 | 54.68 | S-LAL18 |
| 4 | 2.11500 | 1.093 | | | |
| 5 | 17.50300 | 2.825 | 1.72151 | 29.23 | S-TIH18 |
| 6 | 54.06300 | 20.100 | | | |
| 7 | Aperture stop | 0.163 | | | |
| 8 | −13.06900 | 0.800 | 1.80518 | 25.42 | S-TIH6 |
| 9 | 4.08500 | 2.945 | 1.72916 | 54.68 | S-LAL18 |
| 10 | −4.82200 | 0.227 | | | |
| 11 | 1406.3390 | 1.315 | 1.74320 | 49.34 | S-LAM60 |
| 12 | −9.70300 | 0.100 | | | |
| 13 | 17.08800 | 1.800 | 1.67790 | 55.34 | S-LAL12 |
| 14 | −37.22300 | 3.378 | | | |
| 15 | ∞ | 1.541 | 1.51633 | 64.14 | Various filter |
| 16 | ∞ | 0.100 | | | |
| 17 | ∞ | 0.4 | 1.51633 | 64.14 | Cover glass |
| 18 | ∞ | BF | | | o |

[Numerical value of parameter of condition]

| (1) | 0.224 |
|---|---|
| (2) | 2.873 |
| (3) | 0.243 |
| (4) | 1.040 |

Next, embodiment 4 will be described. The embodiment 4 is an embodiment with regard to a structure shown in the FIG. 4.

Figure 4:
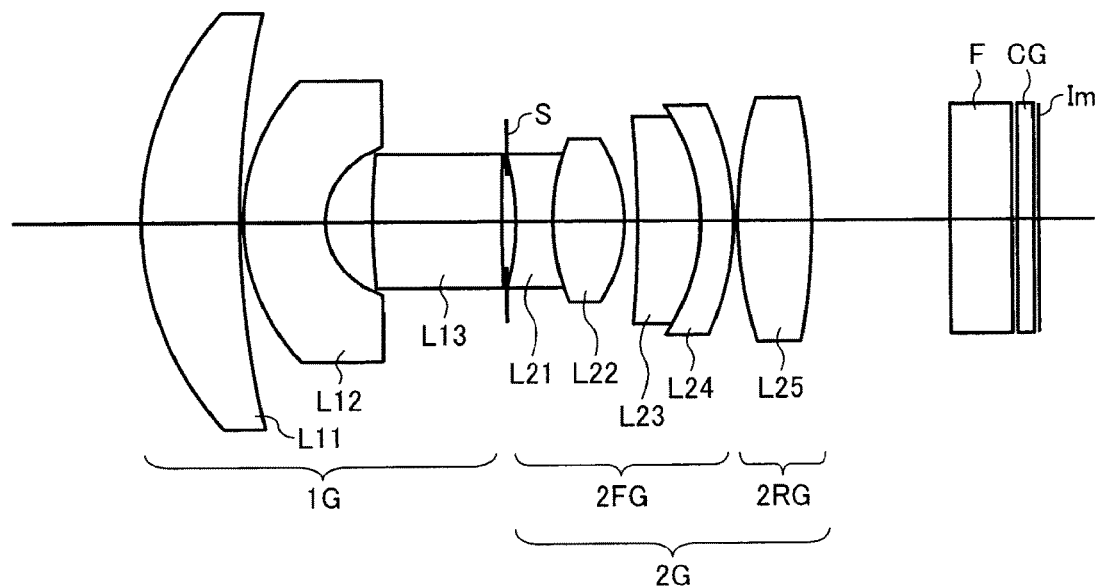
FIG. 4 is a diagram illustrating a structure of an imaging optical system of Example 4.

In the imaging optical system of the embodiment 4, as shown in FIG. 4, a first lens group 1G, an aperture stop S, a second lens group 2G are arranged in order from the object side to the image side.

The first lens group 1G includes a lens L11 having a positive refractive power and a meniscus shape turning a convex surface to the object side, a lens L12 having a negative refractive power and a meniscus shape turning a convex surface to the object side, and a lens L13 having a positive refractive power and a meniscus shape turning a convex surface to the object side. These lenses are arranged in that order from the object side.

The second lens group 2G includes a second F lens group 2FG and a second R lens group 2RG. The second F lens group 2FG includes a cemented lens of a lens L21 which is a biconcave lens and a lens L22 which is a biconvex lens, a cemented lens of a lens L23 having a positive refractive power and a meniscus shape turning a concave surface to the object side and a lens L24 having a negative refractive power and a meniscus shape turning a concave surface to the object side. These lenses are arranged in that order from the object side. The second R lens group 2RG includes a lens L25 which is a biconvex lens.

The imaging optical system of the embodiment 4 includes eight lenses.

Embodiment 4 f = 5.35, Fno = 1.89, ω = 29.27

| Surface number | R | D | Nd | vd | Glass type |
|---|---|---|---|---|---|
| 1 | 9.12500 | 2.400 | 1.76200 | 40.10 | S-LAM55 |
| 2 | 26.64300 | 0.100 | | | |

-continued

Embodiment 4

| | | | | | |
|---|---|---|---|---|---|
| 3 | 5.94700 | 2.000 | 1.81600 | 46.62 | S-LAH59 |
| 4 | 2.16900 | 1.148 | | | |
| 5 | 19.06300 | 3.200 | 1.92286 | 18.90 | S-NPH2 |
| 6 | 57.49500 | 0.100 | | | |
| 7 | Aperture stop | 0.211 | | | |
| 8 | −7.27600 | 0.921 | 1.80809 | 22.76 | S-NPH1 |
| 9 | 6.59100 | 1.748 | 1.69680 | 55.53 | S-LAL14 |
| 10 | −4.41900 | 0.316 | | | |
| 11 | −31.18300 | 1.531 | 1.76200 | 40.10 | S-LAM55 |
| 12 | −6.02200 | 0.800 | 1.59270 | 35.31 | S-FTM16 |
| 13 | −8.09500 | 0.100 | | | |
| 14 | 12.35800 | 1.800 | 1.67790 | 55.34 | S-LAL12 |
| 15 | −19.77800 | 3.395 | | | |
| 16 | ∞ | 1.541 | 1.51633 | 64.14 | Various filter |
| 17 | ∞ | 0.100 | | | |
| 18 | ∞ | 0.4 | 1.51633 | 64.14 | Cover glass |
| 19 | ∞ | BF | | | ○ |

[Numerical value of parameter of condition]

| | |
|---|---|
| (1) | 0.380 |
| (2) | 3.467 |
| (3) | 0.243 |
| (4) | 1.301 |

Figure 5:
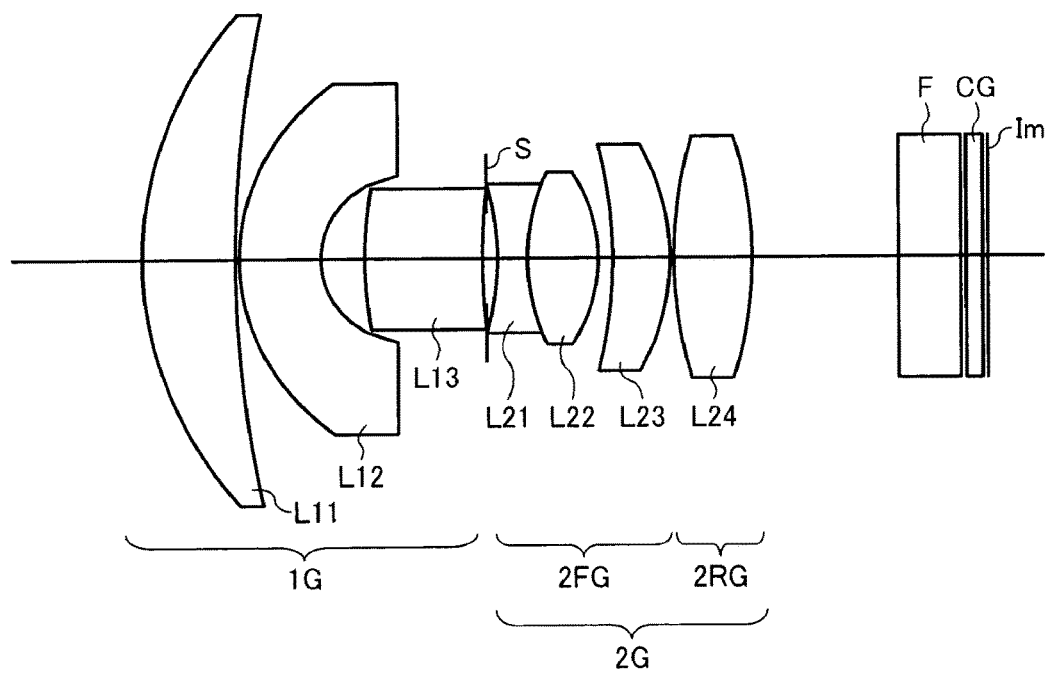
FIG. 5 is a diagram illustrating a structure of an imaging optical system of Example 5.
Figure 8:
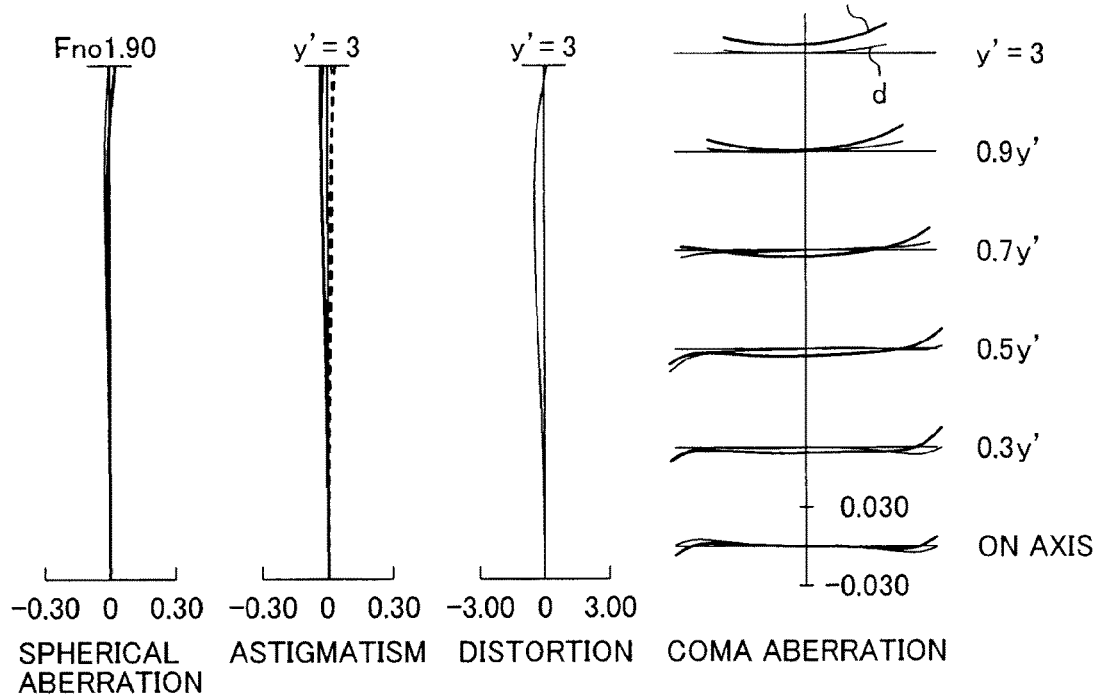
FIG. 8 is a view showing aberrations of Example 3.
Figure 9:
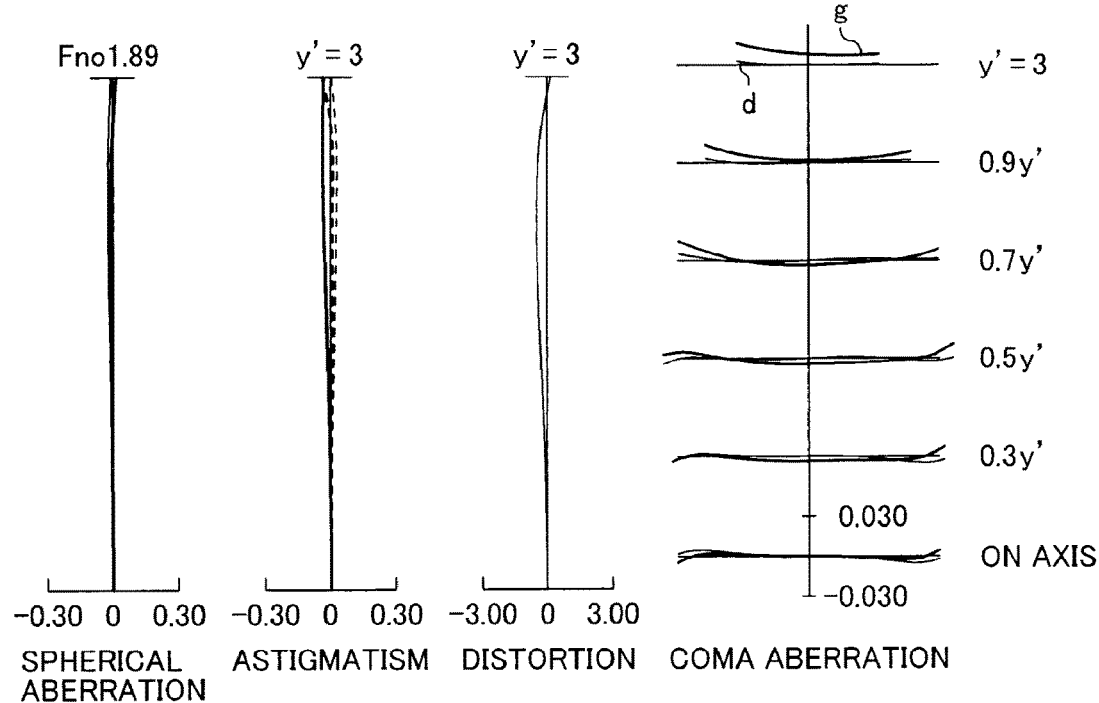
FIG. 9 is a view showing aberrations of Example 4.
Figure 10:
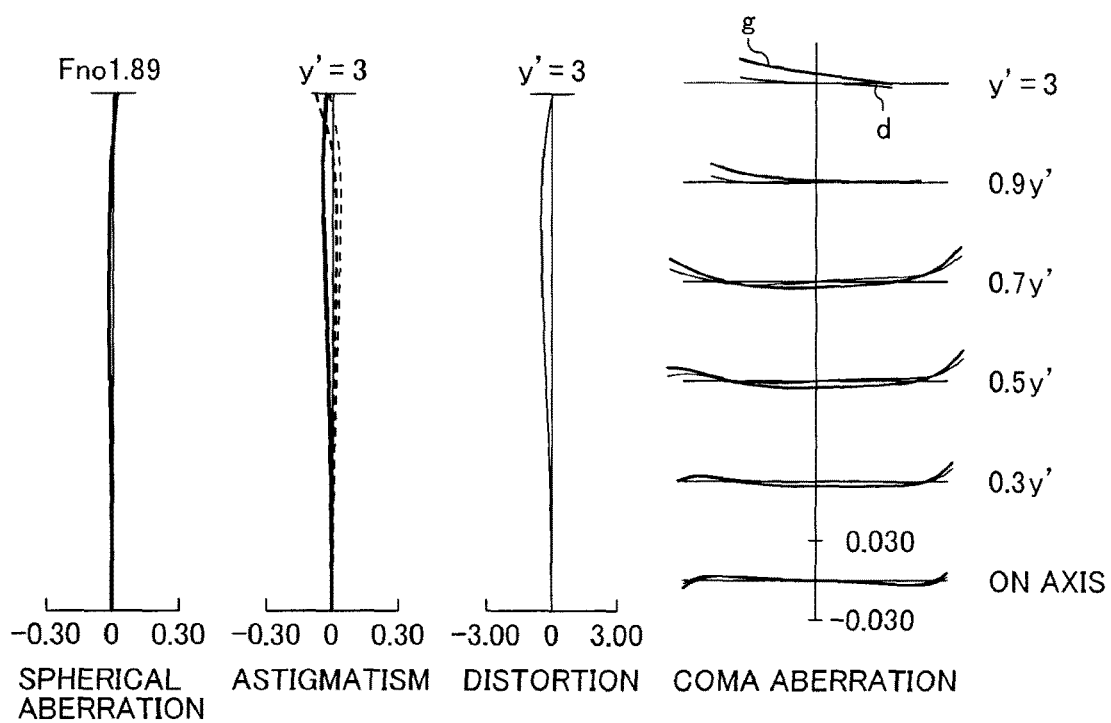
FIG. 10 is a view showing aberrations of Example 5.

Next, embodiment 5 will be described. The embodiment 5 is an embodiment with regard to a structure shown in the FIG. 5. In the imaging optical system of the embodiment 5, as shown in FIG. 5, a first lens group 1G, an aperture stop S, a second lens group 2G are arranged in order from the object side to the image side.

The first lens group 1G includes a lens L11 having a positive refractive power and a meniscus shape turning a convex surface to the object side, a lens L12 having a negative refractive power and a meniscus shape turning a convex surface to the object side, and a lens L13 having a positive refractive power and a meniscus shape turning a convex surface to the object side. These lenses are arranged in that order from the object side.

The second lens group 2G includes a second F lens group 2FG and a second R lens group 2RG. The second F lens group 2FG includes a cemented lens of a lens L21 which is a biconcave lens and a lens L22 which is a biconvex lens, a lens L23 having a positive refractive power and a meniscus shape turning a concave surface to the object side. These lenses are arranged in that order from the object side. The second R lens group 2RG includes a lens L24 which is a biconvex lens.

The imaging optical system of the embodiment 5 includes seven lenses.

Embodiment 5 f = 5.35, Fno = 1.89, ω = 29.23

| Surface number | R | D | Nd | vd | Glass type |
|---|---|---|---|---|---|
| 1 | 9.67200 | 2.259 | 1.76200 | 40.10 | S-LAM55 |
| 2 | 30.85300 | 0.100 | | | |
| 3 | 5.61700 | 1.963 | 1.81600 | 46.62 | S-LAH59 |
| 4 | 2.17100 | 1.065 | | | |
| 5 | 10.82800 | 2.859 | 1.80518 | 25.42 | S-TII16 |
| 6 | 17.42100 | 0.100 | | | |
| 7 | Aperture stop | 0.199 | | | |
| 8 | −7.37700 | 0.800 | 1.80518 | 25.42 | S-TIH6 |
| 9 | 5.47000 | 1.711 | 1.65160 | 58.55 | S-LAL7 |
| 10 | −4.24900 | 0.351 | | | |
| 11 | −12.26600 | 1.380 | 1.77250 | 49.60 | S-LAH66 |

-continued

Embodiment 5

| | | | | | |
|---|---|---|---|---|---|
| 12 | −6.30100 | 0.100 | | | |
| 13 | 11.74900 | 1.885 | 1.67790 | 55.34 | S-LAL12 |
| 14 | −10.93300 | 3.529 | | | |
| 15 | ∞ | 1.541 | 1.51633 | 64.14 | Various filter |
| 16 | ∞ | 0.100 | | | |
| 17 | ∞ | 0.4 | 1.51633 | 64.14 | Cover glass |
| 18 | ∞ | BF | | | ○ |

[Numerical value of parameter of condition]

| | |
|---|---|
| (1) | 0.468 |
| (2) | 3.523 |
| (3) | 0.260 |
| (4) | 1.598 |

FIG. 6 to FIG. 10 are views showing aberrations of Example 1 to 5, respectively.

A solid line in an astigmatism indicates a sagittal plane, and a broken line in the astigmatism indicates a meridional plane.

"d" in FIG. 6 to FIG. 10 shows aberrations with regard to a d-line of spectrum. "g" in FIG. 6 to FIG. 10 shows aberrations with regard to a g-line of spectrum.

As is clear from these views showing aberrations, aberrations are sufficiently corrected in each embodiment, and it shows improved performance.

The imaging optical system of these embodiments has a wide angle of view (a half field angle: approximately 29 degrees), a large diameter (F number: equal to approximately 2 or less).

Furthermore, the imaging optical system is small in size (seven lenses to eight lenses), and the distortion is sufficiently small.

The imaging optical system of each embodiment forms an image of an object on a light receiving surface of an imager.

As described above, an object of the present disclosure to provide a novel imaging optical system which has a good performance and a wide angle of view.

There is not particular limitation in type of imager which is combined with the imaging optical system of the embodiment. Because distortion is sufficiently corrected and superior optical performance can be obtained in the embodiment 1 to the embodiment 5, an imager having a high-resolution such as SXGA size imager can be combined with the imaging optical system of the embodiment.

Although the embodiments of the present disclosure have been described above, the present disclosure is not limited thereto.

The imaging optical system of the embodiment can be used as an imaging optical system of a silver salt camera. Furthermore, the imaging optical system of the embodiment can be used for a digital camera, a portable information terminal device, a video device, an optical sensor, a projector, or the like.

As described above, by the present disclosure, the following imaging optical system, stereo camera device and car-mounted camera device can be obtained.

[1]

An imaging optical system, comprising: in order from an object side to an image side, a first lens group having a negative refractive power, an aperture stop, a second lens group having a positive refractive power, the first lens group including in order from the object side a
first lens having a positive refractive power and a meniscus shape turning a convex surface to the object side, a second lens having a negative refractive power, a third lens having a positive refractive power, a lens surface positioned closest to the image side in the first lens group is a concave surface to the image side, a lens surface positioned closest to the object side in the second lens group is a concave surface to the object side.

[2]

The imaging optical system according to [1], wherein an air gap between the second lens in the first lens group and the third lens in the first lens group is the widest in the whole system.

[3]

The imaging optical system according to [1] or [2], wherein a focal distance f of a whole system of the imaging optical system and a focal distance fa of an air lens which is formed between a lens surface positioned closest to the image side in the first lens group and a lens surface positioned closest to the object side in the second lens group satisfy the following condition (1).

$$0.15 < |f/fa| < 1.00 \quad (1)$$

[4]

The imaging optical system according to any one of [1] to [3], wherein the focal distance f of the whole system and a focal distance f1 of the first lens group satisfy the following condition (2).

$$2.00 < |f1/f| < 20.00 \quad (2)$$

[5]

The imaging optical system according to any one of [1] to [4], wherein the focal distance f of the whole system and a distance AL on an optical axis between a lens surface positioned closest to the object side in the first lens group and an imaging plane satisfy the following condition (3).

$$0.15 < f/AL < 0.50 \quad (3)$$

[6]

The imaging optical system according to any one of [1] to [5], wherein the second lens group having a positive refractive power positioned in the image side of the aperture stop includes a second F lens group having a positive refractive power and a second R lens group having a positive refractive power, the second F lens group includes at least one lens having a negative refractive power and at least one lens having a positive refractive power, the second R lens group includes a lens having a positive refractive power.

[7]

The imaging optical system according to [6], wherein the focal distance f of the whole system and a focal distance f2F of the second F lens group satisfy the following condition (4).

$$0.50 < f2F/f < 2.50 \quad (4)$$

[8]

The imaging optical system according to any one of [1] to [7], wherein all lenses of the first lens group and the second lens group are glass spherical lenses.

[9]

A stereo camera device comprising the imaging optical system according to any one of [1] to [8].

[10]

A car-mounted camera device comprising the imaging optical system according to any one of [1] to [8].

[11]

The car-mounted camera device comprising the stereo camera device according to [9].

[12]

The stereo camera device according to [9] comprising a function to digitize a photographed image with the imaging optical system.

[13]

The car-mounted camera device according to [10] or [11] comprising a function to digitize a photographed image with the imaging optical system.

What is claimed is:

1. An imaging optical system, consisting of, in order from an object side to an image side:
    a first lens group having a negative refractive power;
    an aperture stop; and
    a second lens group having a positive refractive power,
    wherein the first lens group consists of, in order from the object side, a first lens having a positive refractive power and a meniscus shape turning a convex surface to the object side, a second lens having a negative refractive power, and a third lens having a positive refractive power,
    wherein a lens surface positioned closest to the image side in the first lens group is a concave surface to the image side, and a lens surface positioned closest to the object side in the second lens group is a concave surface to the object side,
    wherein a focal distance f of a whole system of the imaging optical system and a focal distance fa of an air lens which is formed between a lens surface positioned closest to the image side in the first lens group and a lens surface positioned closest to the object side in the second lens group satisfy the following condition (1)

$$0.15 < |f/fa| < 1.00, \quad (1)$$

wherein the focal distance f of a whole system of the imaging optical system and a focal distance f1 of the first lens group satisfy the following condition (2)

$$2.00 < |f1/f| < 20.00, \quad (2)$$

wherein the third lens having a positive refractive power is a single lens, and
    wherein the second lens group includes three lens including, in order from the object side, a first biconcave lens which is cemented to a second biconvex lens.

2. The imaging optical system according to claim 1, wherein the focal distance f of a whole system of the imaging optical system and a focal distance f1 of the first lens group satisfy the following condition (2A)

$$2.50 < |f1/f| < 15.00 \quad (2A).$$

3. The imaging optical system according to claim 1, wherein the focal distance f of a whole system of the imaging optical system and a distance AL on an optical axis between a lens surface positioned closest to the object side in the first lens group and an imaging plane satisfy the following condition (3)

$$0.15 < f/AL < 0.50 \quad (3).$$

4. The imaging optical system according to claim 1, wherein the focal distance f of a whole system of the imaging optical system and a distance AL on an optical axis between a lens surface positioned closest to the object side in the first lens group and an imaging plane satisfy the following condition (3A)

$$0.20 < f/AL < 0.40 \quad (3A).$$

5. The imaging optical system according to claim 1, wherein the focal distance f of a whole system of the imaging optical system and a distance AL on an optical axis between a lens surface positioned closest to the object side in the first lens group and an imaging plane satisfy the following condition (3)

$$0.15 < f/AL < 0.50 \qquad (3).$$

6. The imaging optical system according to claim 1, wherein the focal distance f of a whole system of the imaging optical system and a distance AL on an optical axis between a lens surface positioned closest to the object side in the first lens group and an imaging plane satisfy the following condition (3)

$$0.15 < f/AL < 0.50 \qquad (3).$$

7. The imaging optical system according to claim 1, wherein the second lens group having a positive refractive power positioned in the image side of the aperture stop includes a second F lens group having a positive refractive power and a second R lens group having a positive refractive power, the second F lens group includes at least one lens having a negative refractive power and at least one lens having a positive refractive power, the second R lens group includes a lens having a positive refractive power.

8. The imaging optical system according to claim 7, wherein the focal distance f of a whole system of the imaging optical system and a focal distance f2F of the second F lens group satisfy the following condition (4)

$$0.50 < f2F/f < 2.50 \qquad (4).$$

9. The imaging optical system according to claim 1, wherein all lenses of the first lens group and the second lens group are glass spherical lenses.

10. A stereo camera device comprising the imaging optical system according to claim 1.

11. A car-mounted camera device comprising the imaging optical system according to claim 1.

12. A car-mounted camera device comprising the stereo camera device according to claim 10.

13. The stereo camera device according to claim 10, further comprising a processor configured to digitize a photographed image with the imaging optical system.

14. The car-mounted camera device according to claim 11, further comprising a processor configured to digitize a photographed image with the imaging optical system.

15. The imaging optical system according to claim 1, wherein an air gap between the second lens in the first lens group and the third lens in the first lens group is widest in the imaging optical system.

* * * * *